March 13, 1928.
A. T. LIGHT
1,662,525
BATCH MEASURING DEVICE
Filed Sept. 24, 1924    2 Sheets-Sheet 1
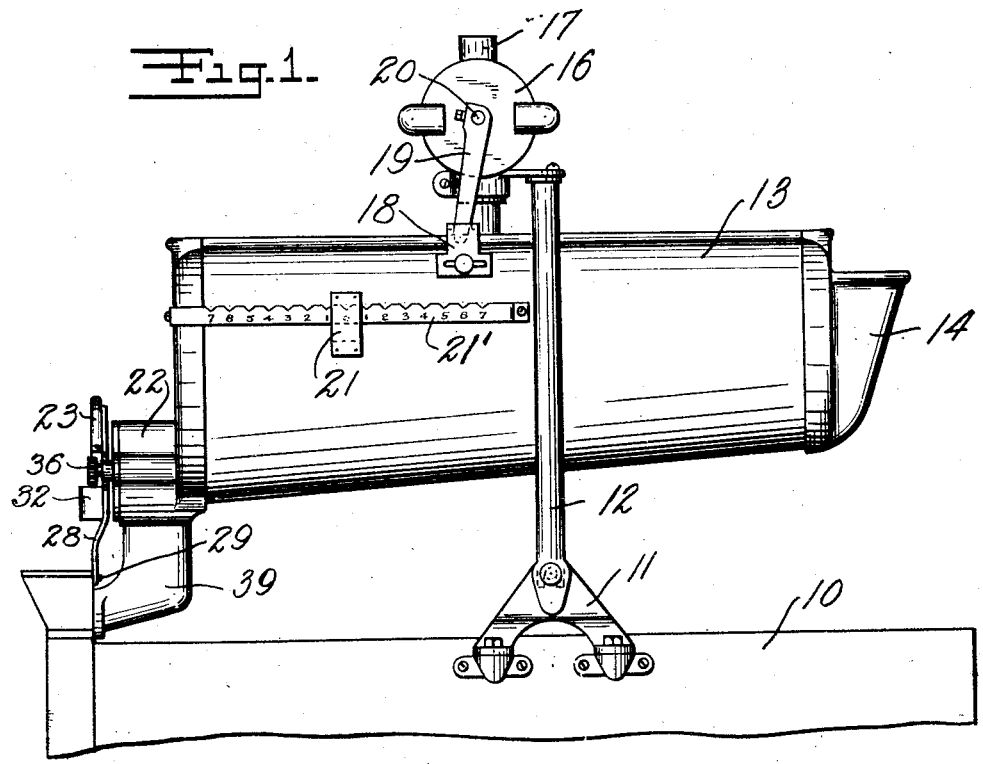
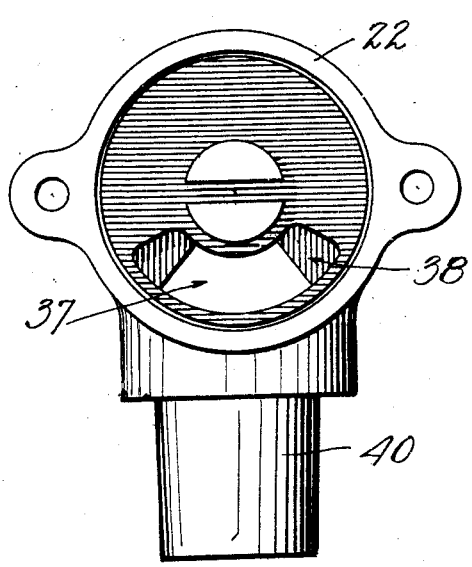
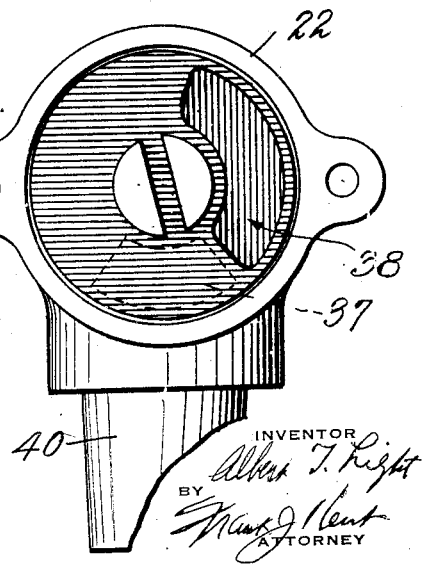

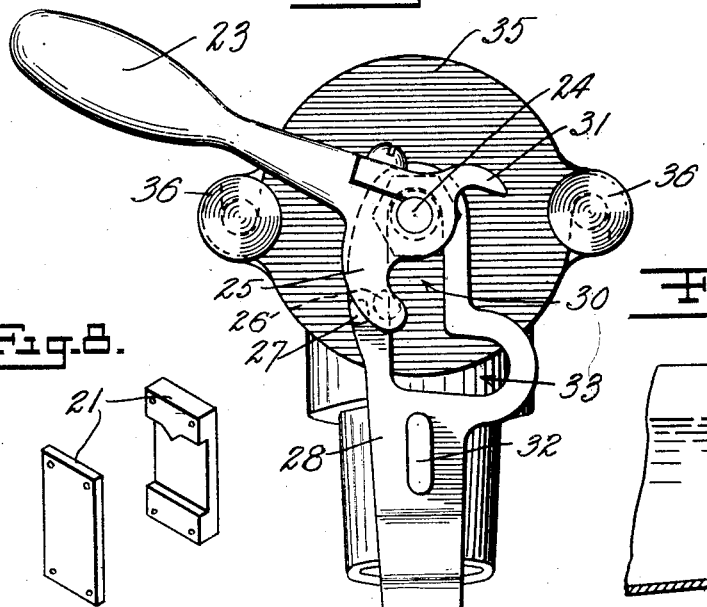
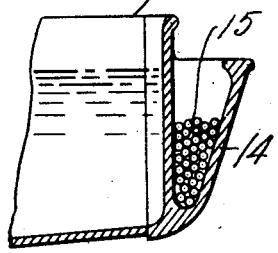
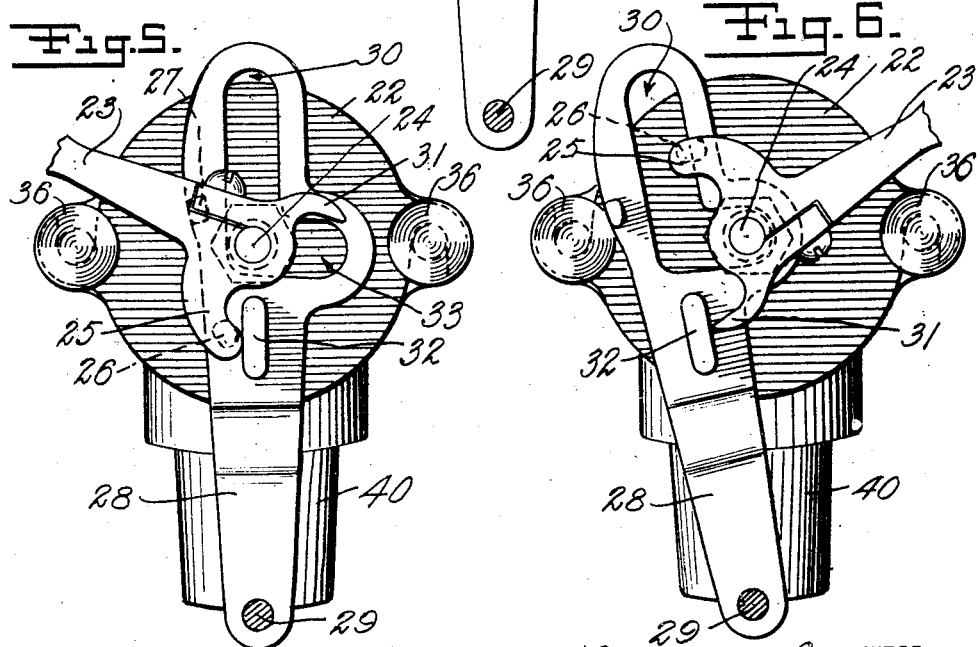
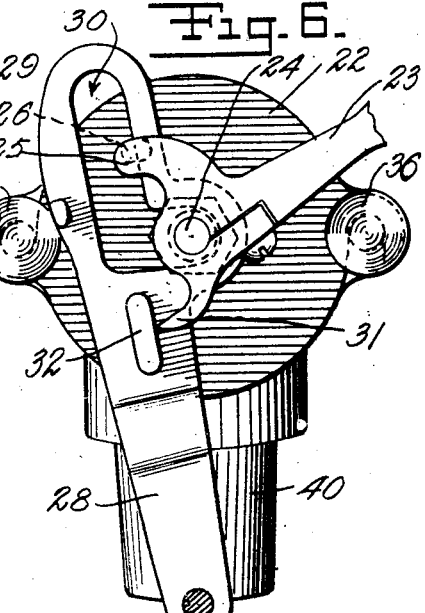

Patented Mar. 13, 1928.

1,662,525

UNITED STATES PATENT OFFICE.

ALBERT T. LIGHT, OF BROOKLYN, NEW YORK.

BATCH-MEASURING DEVICE.

Application filed September 24, 1924. Serial No. 739,745.

This invention relates generally to a batch measuring device for use in connection with ice cream making machines.

A general object of the invention is to provide a measuring or weighing device of the general type indicated and which will include the provision of means for preventing the opening of a valve to permit the passage of a batch into the freezing receptacle until the full complement of material has been supplied to make up the batch. On the other hand, means are also provided for locking the batch weighing device into position to discharge the contents thereof into the freezer and to prevent the interruption of the discharging operation until the batch has been completely drained from the weighing device. Upon manual release of the locking means when the discharge of the batch has been completely effected, means are provided for automatically swinging the batch weighing device to receiving position and at the same time automatically opening the supply valve through which material is again supplied to the weighing device.

Other features of the invention will be hereinafter referred to.

In the drawings in which a preferred embodiment of the invention has been selected for illustration, Figure 1 is a view in side elevation of a batch weighing device embodying the invention.

Figure 2 is a view in front elevation of a discharge valve device for use in connection with the batch weighing device of Figure 1 and showing the valve members in open position.

Figure 3 is a view similar to Figure 2 showing the valve members in closed position.

Figure 4 is a view in front elevation of the valve casing together with cooperating means for holding the valve in closed position during the operation of filling the weighing device.

Figure 5 is a view similar to Figure 4 showing the valve mechanism lowered to its discharging position by the accumulation of the batch in the weighing device but with the valve still in its closed position.

Figure 6 is a view similar to Figure 5 showing the valve handle moved to its open position and locked therein.

Figure 7 is a sectional view of the rear end of the weighing device showing means for automatically swinging the weighing device to receiving position when the discharge valve has been manually closed.

Figure 8 is a perspective view of a slidable weight member used in connection with a scale beam carried by the weighing device.

Referring to the drawings for a more detailed description of the invention, an ice cream making machine is shown at 10 in Figure 1 of the drawing and is provided with a bracket member 11 on which a framework 12 is supported within which a batch weighing receptacle 13 is mounted to swing between two limiting positions defining a batch receiving position and a batch discharging position.

The batch weighing receptacle 13 is provided at its rear end with a pocket 14 adapted to receive weight members 15 such as grains of shot or the like for the purpose of automatically swinging the batch receiving receptacle 13 from the discharging position shown in Figure 1 of the drawing to a position in which the front end thereof will be elevated. The movement of the batch receiving receptacle to the batch receiving position automatically effects the opening of a valve 16 to provide for the delivery of the mixture to be frozen from the supply pipe 17 to the receptacle 13. This valve opening operation is effected through the engagement of an adjustable lug 18 carried by the receptacle 13 with a valve operating arm 19 carried by the shaft 20 of the valve contained in the valve casing 16.

The reversal of the process and the closing of the valve 16 is accomplished by the completion of delivery of a predetermined weight of mixture into the receptacle 13 whereupon the receptacle tilts to the discharging position shown in Figure 1 of the drawing. The determination of the weight of material necessary to swing the batch receiving receptacle to supply valve closing position when the desired amount of mixture has been received is determined by the position of a weight member 21 on the scale beam 21', this position being different for different mixtures.

In order to prevent opening of a discharge valve housed in the casing 22 at the forward end of the batch weighing receptacle 13 before the desired amount of material has been supplied to the receptacle, a valve arm 23 mounted on the valve shaft 24 is provided with an arm 25 bearing a stud 26 which takes a position opposite to a stud 27 carried on a frame member 28 which is pivotally supported on the framework of the freezer receptacle 10 at 29. With this arrangement it is impossible to swing the valve handle 23 from the closed position shown in Figure 4 of the drawing because of the locking relation of the two cooperating studs 26 and 27. It will be seen therefore that so long as the forward end of the receptacle 13 is maintained in its raised or batch receiving position, the locking relation of the lugs 26 and 27 will be maintained and the valve prevented from being moved to its discharging position. When the predetermined weight of material has been received in the receptacle 13 and the receptacle has tilted to the position shown in Figure 1 of the drawing, the valve device 22 is lowered with relation to the frame member 28, the valve shaft 24 moving downwardly through a slot 30 in the frame member 28 to a position which removes the stud 26 from locking relation with the stud 27. It will be seen that the valve handle 23 is no longer locked against movement so that the handle can be swung from the valve closing position shown in Figures 4 and 5 to the valve opening position shown in Figure 6 of the drawing. The movement of the valve handle to the valve opening position shown in Figure 6 of the drawing is accompanied by the automatic locking of the valve in its opened position. This is accomplished by the engagement of a lug 31 carried by the valve handle member 23 with an outstanding lug 32 carried by the pivoted frame member 28. The effect of the engagement of the lug 31 with the lug 32 is to swing the frame member 28 about its pivot 29 to the position shown in Figure 6 in which a laterally extending slot 33 in the frame member 28 is moved into position to receive therein the valve shaft 24. This arrangement locks the valve shaft and connected parts from upward movement such as would prevent the complete draining of the charge weighing member 13 into the freezer 10. This also prevents the opening of the supply valve 16 to initiate the delivery of a new batch of mixture to the receptacle 13 before the previous batch has been completely emptied therefrom.

As has been pointed out therefore with the structural arrangement shown the discharge valve mechanism carried by the batch receptacle 13 is locked against opening when the receptacle is in its charge receiving position, and, on the other hand, the closing of the valve when the receptacle has been lowered to discharging position effectively locks the receptacle against being tilted to receiving position until the operator closes the valve following the complete draining of the receptacle.

There are thus five steps of operation of the valve handle 23 in a cycle of operations which includes the filling and draining of the receptacle 13 and the return of the receptacle to charge receiving position. In Figure 4 is shown the first position of the valve handle which is locked in closed position in the charge receiving position of the receptacle 13. Figure 5 shows the second position in which the valve is in closed position but in its lower situation ready to be opened to discharge material into the freezer receptacle. Figure 6 shows the valve parts moved to open position to discharge material from the receptacle 13. Figure 5 shows again the closing of the valve accompanied by the swinging of the locking member 28 to a position to permit the upward swinging movement of the forward end of the emptied receptacle which is brought about by the weight of the shot 15 in the pocket 14. The next position is shown again in Figure 4 where the valve parts are raised to their uppermost position and are thereby locked in open position to receive the charge from the supply valve 16.

The discharge valve mechanism includes a forward plate 35 which is held in place by the knurled screws 36 at the opposite sides thereof. The plate 35 can be readily removed from its position by loosening the screws 36 and turning the plate 35 in a counter-clockwise direction to thereby provide access to the interior of the valve casing 22 for any purpose. An open position of the valve parts to provide a port 37 through which the material is discharged is shown in Figure 2 of the drawing. A closed position of the same parts is indicated in Figure 3 in which the ports 37 and 38 are out of register.

In order to facilitate the delivery of the batch to the freezer 10 a hopper or receiving device 39 is provided on the forward end of the freezer 10 into which a nozzle-like member 40 carried by the valve mechanism 22 projects in the lowered position of the forward part of the receptacle 13.

What I claim is:—

1. In a batch weighing device, a receptacle arranged to tilt to discharging position when a predetermined weight of material has been received therein, a discharge valve, means for operating the valve, and means cooperating with the valve operating means for locking the valve in closed position when the receptacle is in charge receiving position.

2. In a batch weighing device, a receptacle arranged to tilt to discharging position when a predetermined weight of material has been received therein, a discharge valve, means for operating the valve, means cooperating with the valve operating means for locking the receptacle in discharging position when the discharge valve is open, and said means cooperating with the valve operating means to lock the valve in closed position when the receptacle is in batch receiving position.

3. In a batch weighing device, a receptacle arranged to tilt to discharging position when a predetermined weight of material has been received therein, a supply valve through which material is delivered to the receptacle, means carried by the receptacle for automatically closing the supply valve when the receptacle is tilted to discharging position and for opening the supply valve when the receptacle is tilted to charge receiving position, a discharge valve on the receptacle, means for operating the valve, and means cooperating with the valve operating means for locking the valve in closed position when the receptacle is in charge receiving position.

4. In a batch weighing device, a receptacle arranged to tilt to discharging position when a predetermined weight of material has been received therein, a supply valve through which material is delivered to the receptacle, means carried by the receptacle for automatically closing the supply valve when the receptacle is tilted to discharging position and for opening the supply valve when the receptacle is tilted to charge receiving position, a discharge valve on the receptacle, means for operating the valve, means cooperating with the valve operating means for locking the receptacle in discharging position, and said means cooperating with the valve operating means for locking the valve in closed position when the receptacle is in charge receiving position.

5. In a batch weighing device, a receptacle arranged to tilt to discharging position when a predetermined weight of material has been received therein, a scale beam carried by the receptacle, a weight member movable along the beam to determine the weight of the batches, a discharge valve, means for operating the valve, means cooperating with the valve operating means for locking the receptacle in discharging position when the discharge valve is open, and said means cooperating with the valve operating means for locking the valve in closed position when the receptacle is in charge receiving position.

6. In a batch weighing device for ice cream freezers, a receptacle mounted on the freezer and arranged to tilt to discharging position when a predetermined weight of material has been received therein, a discharge valve carried by the receptacle, means for operating the valve and means on the freezer and cooperating with the valve operating means for locking the receptacle in position to discharge into the freezer when the discharge valve is open, and for locking the valve in closed position when the receptacle is in charge receiving position.

7. A batch-weighing device comprising a receptacle arranged to move from a charge-receiving position to a discharge position under a predetermined weight of material therein, a discharge valve controlling flow of material from the receptacle, and means preventing opening of the discharge valve when the receptacle is in charge-receiving position.

8. A batch-weighing device comprising a receptacle arranged to move from a charge-receiving position to a discharge position under a predetermined weight of material therein, a discharge valve controlling flow of material from the receptacle, mechanism for operating the valve, and means cooperating with the valve-operating mechanism for preventing opening of the discharge valve when the receptacle is in charge-receiving position.

9. A batch-weighing device comprising a receptacle arranged to move from a charge-receiving position to a discharge position under a predetermined weight of material therein, a discharge valve controlling flow of material from the receptacle, mechanism for operating the valve, and locking means cooperating with the valve-operating mechanism for preventing opening of the discharge valve when the receptacle is in charge-receiving position, said locking means permitting opening of the discharge valve when the receptacle is in discharge position.

10. A batch-weighing device comprising a receptacle arranged to move from a charge-receiving position to a discharge position under a predetermined weight of material therein, a discharge valve controlling flow of material from the receptacle, operating mechanism connected to the valve, locking means, and a part on said locking means cooperating with a part on said operating mechanism to prevent opening movement of the discharge valve when the receptacle is in charge-receiving position.

11. A batch-weighing device comprising a receptacle arranged to move from a charge-receiving position to a discharge position under a predetermined weight of material therein, a discharge valve controlling flow of material from the receptacle, operating mechanism connected to the valve, locking means, a part on said locking means cooperating with a part on said operating mechanism to prevent opening movement of the discharge valve when the receptacle is in charge-receiving position, and a part on said operating mechanism cooperating with a part on said locking means upon opening movement of the discharge valve when the receptacle is in discharge position to move the locking means to a position in which the locking means prevents upward movement of the receptacle.

12. In combination, a container, an inlet on the container, a receptacle arranged to move from a charge-receiving position to a discharge position under a predetermined weight of material therein, a discharge valve controlling flow of material from the receptacle, a rotatable stem connected to the valve, a handle connected to the stem, a frame pivotally carried by the container, an L-shaped slot in said frame through which the stem projects, cooperating means carried by the frame and valve handle to prevent opening movement of the discharge valve when the stem is at the upper end of the slot, and cooperating means carried by the frame and valve handle to move the frame to engage the transverse branch of the slot with the stem upon opening movement of the discharge valve when the receptacle is in discharge position, thereby locking the receptacle against upward movement while the discharge valve is in open position.

13. A batch-weighing device comprising a receptacle arranged to move from a charge-receiving position to a discharge position under a predetermined weight of material therein, a discharge valve controlling flow of material from the receptacle, a rotatable stem for operating the valve, and locking means engaged with the stem upon opening movement of the valve when the receptacle is in discharge position, said locking means preventing upward movement of the receptacle while the valve is in open position.

14. A batch-weighing device comprising a receptacle arranged to move from a charge-receiving position to a discharge position under a predetermined weight of material therein, a discharge valve controlling flow of material from the receptacle, a rotatable stem for operating the valve, locking means preventing opening of the discharge valve when the receptacle is in charge-receiving position, and locking means preventing upward movement of the receptacle while the discharge valve is open.

In testimony whereof I affix my signature.

ALBERT T. LIGHT.